(12) United States Patent
Burns et al.

(10) Patent No.: US 8,869,645 B2
(45) Date of Patent: Oct. 28, 2014

(54) LINEAR TRAVEL ADJUSTMENT ASSEMBLY

(75) Inventors: Kevin M. Burns, Montrose, MI (US); Melvin L. Tinnin, Clio, MI (US); John Schulz, Hemlock, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 310 days.

(21) Appl. No.: 13/296,559

(22) Filed: Nov. 15, 2011

(65) Prior Publication Data

US 2013/0118290 A1 May 16, 2013

(51) Int. Cl.
*B62D 1/18* (2006.01)
*B62D 1/184* (2006.01)

(52) U.S. Cl.
CPC .................................... *B62D 1/184* (2013.01)
USPC ............................................. 74/493; 280/775

(58) Field of Classification Search
CPC ........... B62D 1/184; B62D 1/16; B62D 1/187
USPC ........... 74/492, 493, 494, 495, 496, 497, 498; 280/775, 776, 777, 779
See application file for complete search history.

(56) References Cited

U.S. PATENT DOCUMENTS

| | | | |
|---|---|---|---|
| 6,543,807 B2 * | 4/2003 | Fujiu et al. .................... 280/775 |
| 7,516,682 B2 * | 4/2009 | Schneider et al. ............... 74/493 |
| 7,743,681 B2 * | 6/2010 | Manwaring et al. ............. 74/498 |
| 8,146,945 B2 * | 4/2012 | Born et al. ...................... 280/775 |
| 8,438,944 B2 * | 5/2013 | Ridgway et al. ................. 74/493 |
| 2005/0217407 A1 * | 10/2005 | Yamamura ....................... 74/492 |
| 2006/0169089 A1 * | 8/2006 | Ohtsu .............................. 74/493 |
| 2007/0013182 A1 * | 1/2007 | Bechtel et al. ................. 280/777 |
| 2007/0068311 A1 * | 3/2007 | Shimoda et al. ................ 74/493 |
| 2008/0087129 A1 * | 4/2008 | Kaneko et al. .................. 74/493 |
| 2009/0229399 A1 * | 9/2009 | Ozsoylu et al. ................. 74/493 |
| 2009/0241721 A1 * | 10/2009 | Inoue et al. ..................... 74/493 |
| 2010/0186536 A1 * | 7/2010 | Cartwright ...................... 74/495 |
| 2010/0300237 A1 * | 12/2010 | Ridgway et al. ................ 74/493 |

* cited by examiner

*Primary Examiner* — Troy Chambers
*Assistant Examiner* — Zakaria Elahmadi
(74) *Attorney, Agent, or Firm* — Cantor Colburn LLP

(57) ABSTRACT

An adjustment assembly for allowing or preventing adjustment of a component and an adjustable steering column are provided. A compression bracket is configured to support the steering column, a rake bracket is configured to support the compression bracket and an actuating lever is slidingly coupled to the compression bracket and slidable along a linear travel path. A linkage assembly is connected to the compression bracket and is coupled to one end of the actuating lever and a clamping assembly is coupled to the linkage assembly and configured to release a clamping force from the component upon movement of the actuating lever from a first position to a second position, and apply a clamping force to the component upon movement of the actuating lever from the second position to the first position.

23 Claims, 5 Drawing Sheets

LINEAR TRAVEL ADJUSTMENT ASSEMBLY

The following description relates to an adjustment assembly, and in particular, an adjustment assembly that is actuated by a linearly travelling lever.

BACKGROUND OF THE INVENTION

Conventional adjustment assemblies, for example, adjustment assemblies which allow for adjustment of a steering column in a vehicle, include a lever that is rotatable between two positions to lock and unlock the adjustment assembly. For example, with a lever in a first position, the adjustment assembly may lock a steering column in a desired position, thereby fixing the steering column against adjustment. The lever may be rotated to a second position, thereby unlocking the adjustment assembly and allowing the steering column to be adjusted.

However, the rotational travel path of these levers may occupy a large area. Accordingly, surrounding components, for example, interior vehicle panels, must be designed to provide a sufficient clearance to accommodate the rotational travel path of the lever. In some cases the surrounding components need to be redesigned or modified to provide sufficient clearance. Further, the rotational travel path may inconvenience a user of the adjustment assembly, as the travel path may interfere with a space occupied by the user.

Smaller levers may be used. However, reducing the size of lever also reduces the mechanical advantage provided by the lever. Thus, a smaller rotational lever may be more difficult to actuate since the smaller lever requires a larger force to actuate.

Accordingly, it is desirable to provide an actuating lever with a smaller travel path that still provides a mechanical advantage to reduce the force required to actuate the lever.

SUMMARY OF THE INVENTION

In one aspect, there is provided an adjustment assembly for allowing or preventing adjustment of a component, the adjustment assembly including a compression bracket configured to at least partially surround the component, a rake bracket configured to at least partially surround the compression bracket and an actuating lever slidingly coupled to the compression bracket and slidable along a linear travel path. The adjustment assembly further includes a linkage assembly connected to the compression bracket and coupled to one end of the actuating lever and a clamping mechanism coupled to the linkage assembly and configured to apply a clamping force to the component to prevent adjustment of the component upon movement of the actuating lever from a first position to a second position, and release a clamping force from the component to allow for adjustment of the component upon movement of the actuating lever from the second position to the first position.

In another aspect, there is provided an adjustable steering column assembly including a steering column, a compression bracket configured to at least partially surround the steering column and a rake bracket configured to at least partially surround the compression bracket and including a rake adjustment slot. The adjustable steering column further includes an actuating lever slidingly coupled to the compression bracket and slidable along a linear travel path, a linkage assembly connected to the compression bracket and coupled to one end of the actuating lever and a clamping assembly coupled to the linkage assembly and configured to release a clamping force from the steering column to allow adjustment of the steering column upon movement of the actuating lever from a first position to a second position, and apply a clamping force to the steering column to prevent adjustment of the steering column upon movement of the actuating lever from the second position to the first position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
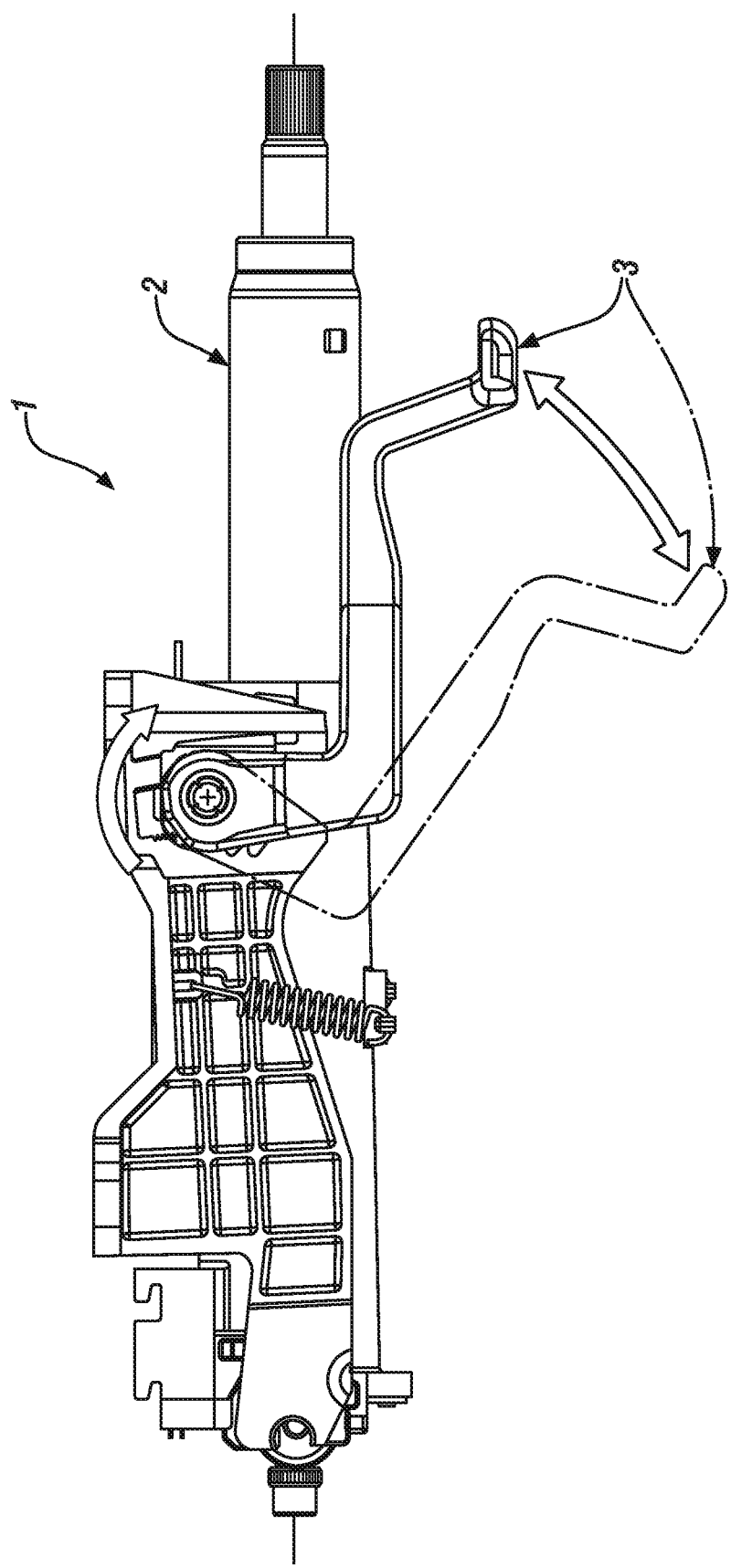
FIG. 1 is a conventional adjustment assembly in a steering column using a rotational lever.

Referring now to the Figures, where the invention will be described with reference to specific embodiments, without limiting same, FIG. 1 illustrates a conventional adjustment assembly 1 used with a steering column 2. The adjustment assembly is actuated by rotating a lever 3 from a first position to a second position.

Figure 2:
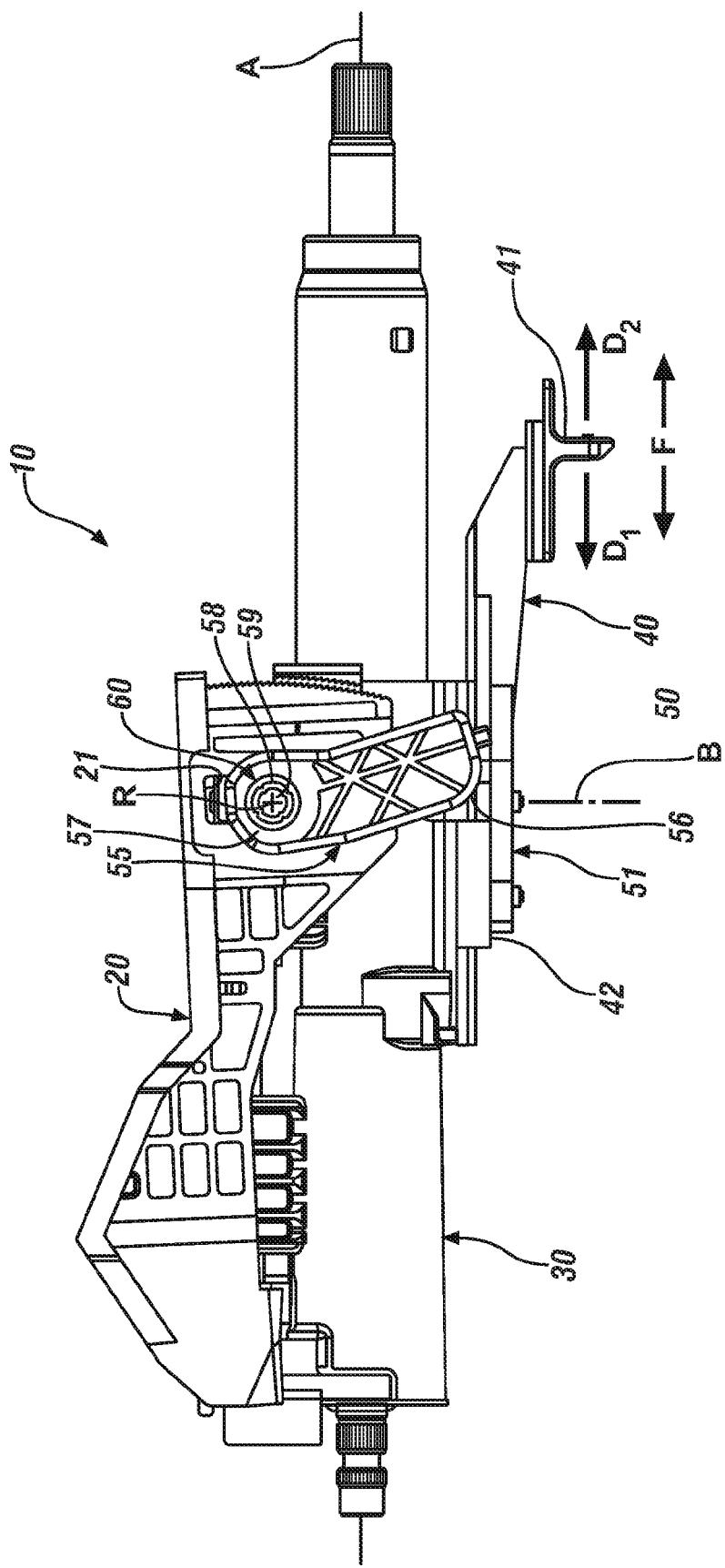
FIG. 2 is a side view of an adjustment assembly according to an exemplary embodiment of the invention.

FIG. 2 illustrates an exemplary embodiment of an adjustment assembly 10 described herein. The adjustment assembly 10 locks and unlocks a component, such that the component may be adjusted when the adjustment assembly is in the unlocked state, and the component is fixed against adjustment when the adjustment assembly is in a locked state. In the non-limiting exemplary embodiment shown in FIG. 2, the component which the adjustment assembly locks and unlocks is a steering column 11. For the purposes of example only, the adjustment assembly 10 will be described herein with reference to a steering column 11. However, it is understood that the adjustment assembly may be used or constructed with other components, such as an adjustable seat.

Figure 3:
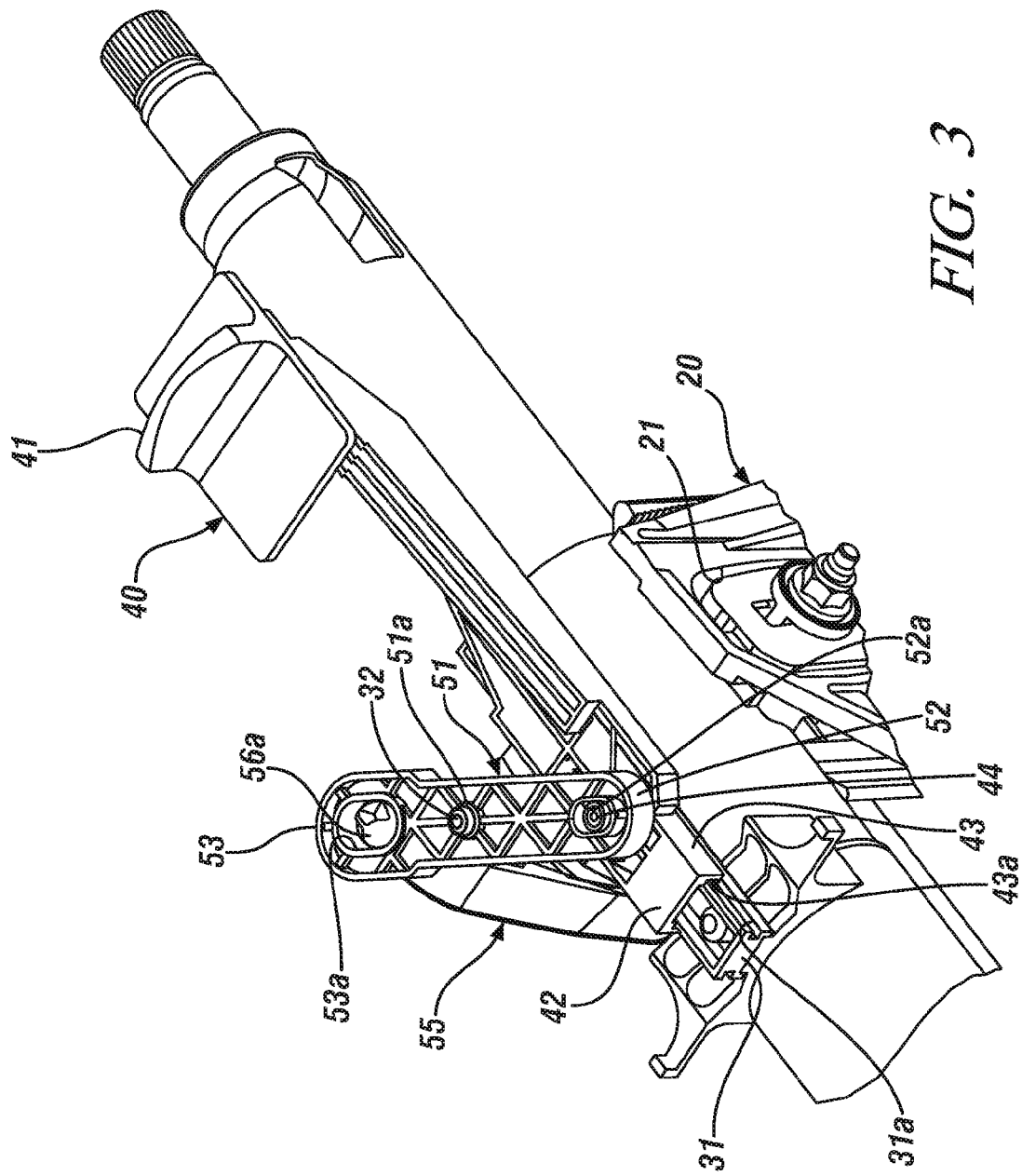
FIG. 3 is a perspective view of an adjustment assembly with an actuating lever in a first position according to one exemplary embodiment of the invention.
Figure 4:
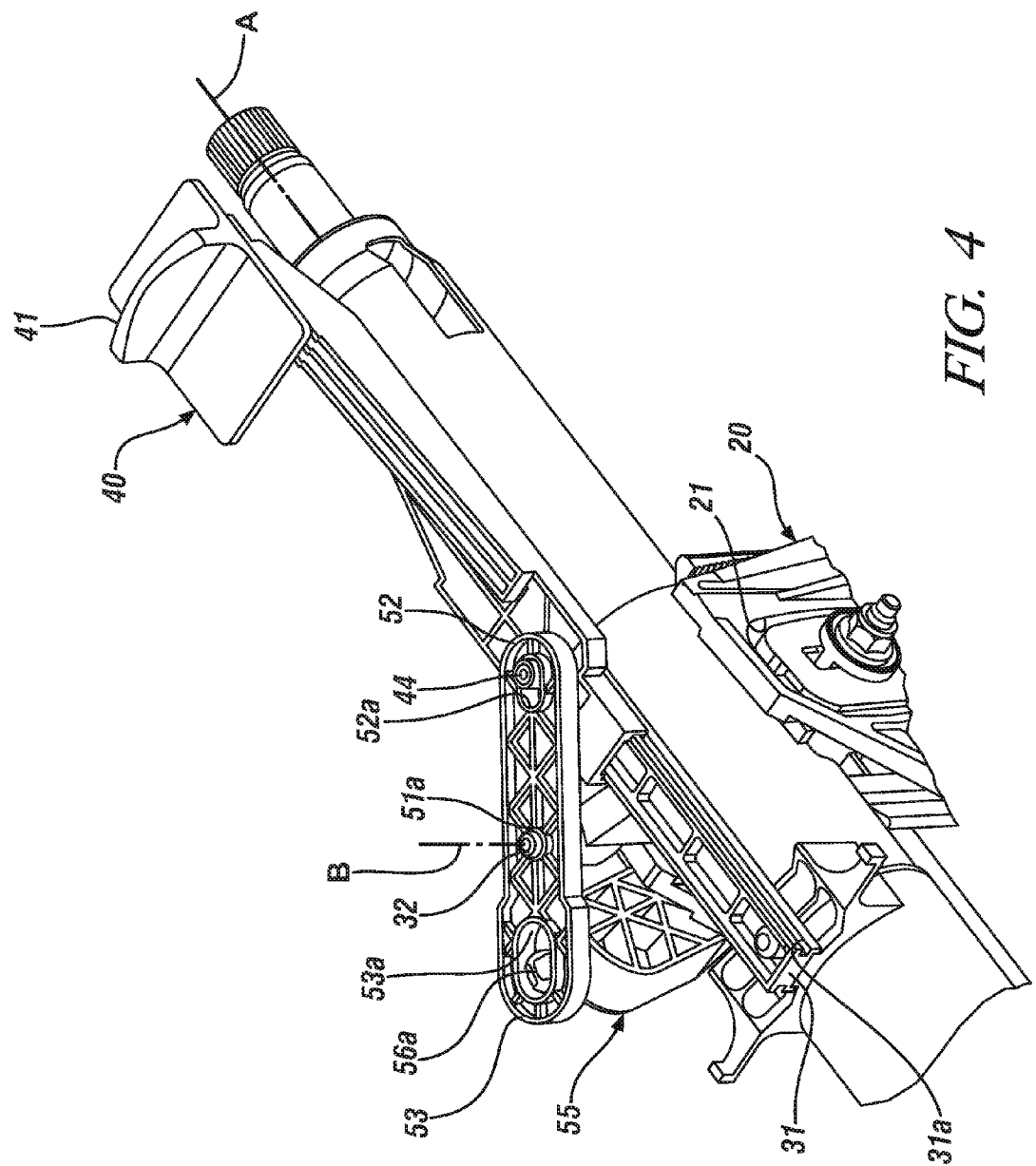
FIG. 4 is a perspective view of an adjustment assembly with an actuating lever in a second position according to another exemplary embodiment of the invention.

The exemplary embodiment of the adjustment assembly 10 shown in FIGS. 2-4 includes a rake bracket 20, a compression bracket 30, a push-pull actuating lever 40, a linkage assembly 50 and a clamping assembly 60.

The rake bracket 20 is fastened to a surrounding support structure, for example, a vehicle in which the steering column 11 is mounted. The rake bracket includes a rake adjustment slot 21. The rake adjustment slot 21 allows for movement of the steering column 11 in a rake or tilt direction when the adjustment assembly 10 is unlocked.

The compression bracket 30 surrounds a portion of the steering column 11. The compression bracket 30 applies or releases a clamping force from the clamping assembly 60 to the steering column 11. In the exemplary embodiment illustrated in FIG. 3, the compression bracket 30 includes a rail 31 connected thereto. The compression bracket also includes a mounting pin 32 extending outwardly therefrom. The rail 31 may be formed integrally with the compression bracket 30 or may be formed separately from the compression bracket 30 and attached thereto with suitable fasteners, for example, screws, bolts, adhesives or a combination thereof.

With reference to FIG. 4, the rail 31 extends in a direction generally parallel with an axis 'A' of the steering column 11. The rail 31 includes a longitudinally extending groove 31*a* extending along respective lateral sides. However, this rail configuration is only one non-limiting example of suitable rail configurations. For example, the rail may include a longitudinal tongue or projection extending along its lateral sides. Alternatively, at least one tongue or groove may be formed along a bottom surface of the rail 31. Further, the rail may include bearing elements, such as rollers or balls. Further still, the rail 31 may extend in directions other than generally parallel to the axis 'A'.

The push-pull actuating lever 40 is slidable along a linear travel path in a direction 'D1' or 'D2' as shown in FIG. 2. In an exemplary embodiment, the actuating lever 40 includes a first end 41 to which a user may selectively apply a force F1, and a second end 42 positioned opposite of the first end 41. The actuating lever further includes a connecting pin 44 projecting outwardly therefrom.

The actuating lever 40 is slidably attached to the rail 31 of the compression bracket 30. In the exemplary embodiments shown in FIGS. 2-4, the second end 42 of the actuating lever 40 has a generally 'U' shaped cross-section. The rail 31 is received within the U shaped cross section. Opposite legs 43 of the U shaped cross-section each include a longitudinally extending tongue or projection 43*a*. In the illustrated embodiment, the tongue 43*a* of the opposite legs of the U-shaped second end 42 are received in respective grooves 31*a* of the rail 31, thereby slidingly attaching the actuating lever 40 to the rail 31 of the compression bracket 30.

It is understood that the example of the slidable connection between the actuating lever 40 and the rail 31 described above is only one example of a suitable sliding connection. In another embodiment, for example, one of the rail 31 or actuating lever 40 may include a projecting dovetail portion extending along a surface thereof, and the other of the rail 31 and actuating lever 40 may include a dovetail shaped groove configured to accept the dovetail projection, to thereby slidably attach the actuating lever 40 to the rail 31. The projection and groove may be of any suitable cross-sectional shape, and is not limited to the shapes shown in the figures or discussed above. Other suitable connections which allow the actuating lever 40 to slide linearly relative to the rail 31 and compression bracket, while generally fixing the actuating lever 40 against movement in other directions may be employed as well.

The linkage assembly 50 connects the actuating lever 40 to the clamping assembly 60. In the exemplary embodiment shown in FIGS. 2-4, the linkage assembly 50 includes a first arm 51 and second arm 55.

The first arm 51 is connected to the compression bracket 30. In the non-limiting exemplary embodiment shown in FIGS. 3-4, the first arm 51 includes a mounting opening 51*a* configured to receive the mounting pin 32 of the compression bracket 30 and be fastened thereto. This connection between the mounting opening 51*a* and the mounting pin 32 rotatably mounts the first arm 51 on the compression bracket 30. In this embodiment, the first arm is configured and positioned to rotate about a first axis 'B' defined by the mounting pin 32, and in a plane that is generally parallel to a plane in which the actuating lever 40 slides. However, the first arm is not limited to rotating only in a plane that is generally parallel to plane in which the actuating lever 40 slides.

A first end 52 of the first arm 51 is connected to the actuating lever 40. In the non-limiting exemplary embodiment illustrated in FIGS. 3-4, the first end 52 includes a first slot 52*a*. The first slot 52*a* is configured to receive the connecting pin 44 of the actuating lever and is shaped to allow the connecting pin 44 to slide therein along the length of the first arm 51 as the connecting pin 44 moves relative to the mounting pin 32. During sliding movement of the actuating lever 40, the connecting pin 44 applies a force on sidewalls of the first slot 52*a*. Accordingly, a force applied by a user to the actuating lever 40 may be transferred to the first arm 51, by way of the connecting pin 44 in the first slot 52*a*, and cause the first arm 51 to rotate about the mounting pin 32 of the compression bracket 30.

The first arm 51 also includes a second end 53 disposed opposite from the first end 52. The second end 53 includes a second slot 53*a* and is connected to the second arm 55. In the illustrated embodiment, a connection between the first and second arms 51, 55 is formed at least partially by the second slot 53*a*. The connection between the first and second arms 51, 55 is discussed further below.

With reference to the exemplary embodiment shown in FIGS. 2-4, the second arm 55 is positioned between the first arm 51 and the clamping assembly 60. The second arm 55 includes a linkage connection end 56 and a clamping connection end 57. In an exemplary embodiment, a ball-shaped projection 56*a* is positioned at the linkage connection end 56. The ball-shaped projection 56*a* is configured to be received by the second slot 53*a* of the first arm 51, thereby forming the connection between the first arm 51 and second arm 55. The ball-shaped projection may 56*a* may slide within the second slot 53*a* of the first arm 51 in a direction along the length of the first arm, and abut against sidewalls of the second slot 53*a* in another direction. It is understood that the ball-shaped projection 56*a* may be of other suitable shapes.

The clamping connection end 57 of the second arm 55 is rotatably mounted relative to the rake bracket 20 and is connected to the clamping assembly 60. In an exemplary embodiment, with reference to FIGS. 2-4, the second arm 55 includes an opening 58 configured to at least partially receive a shaft 59, thereby rotatably mounting the second arm 55 relative to the compression bracket 30 and rake bracket 20. The shaft 59 extends at least partially though the rake bracket 20 and compression bracket 30 and defines a second, or rotation, axis 'R'.

The clamping connection end 57 of the second arm 55 is connected to the clamping assembly 60. In one embodiment, a portion of the clamping assembly is overmolded to an interior surface of the clamping connection end 57 of the second arm 55. Rotation of the second arm 55 in one direction causes rotation of the clamping assembly and thereby moves the clamping assembly between a locked and unlocked position.

Figure 5:
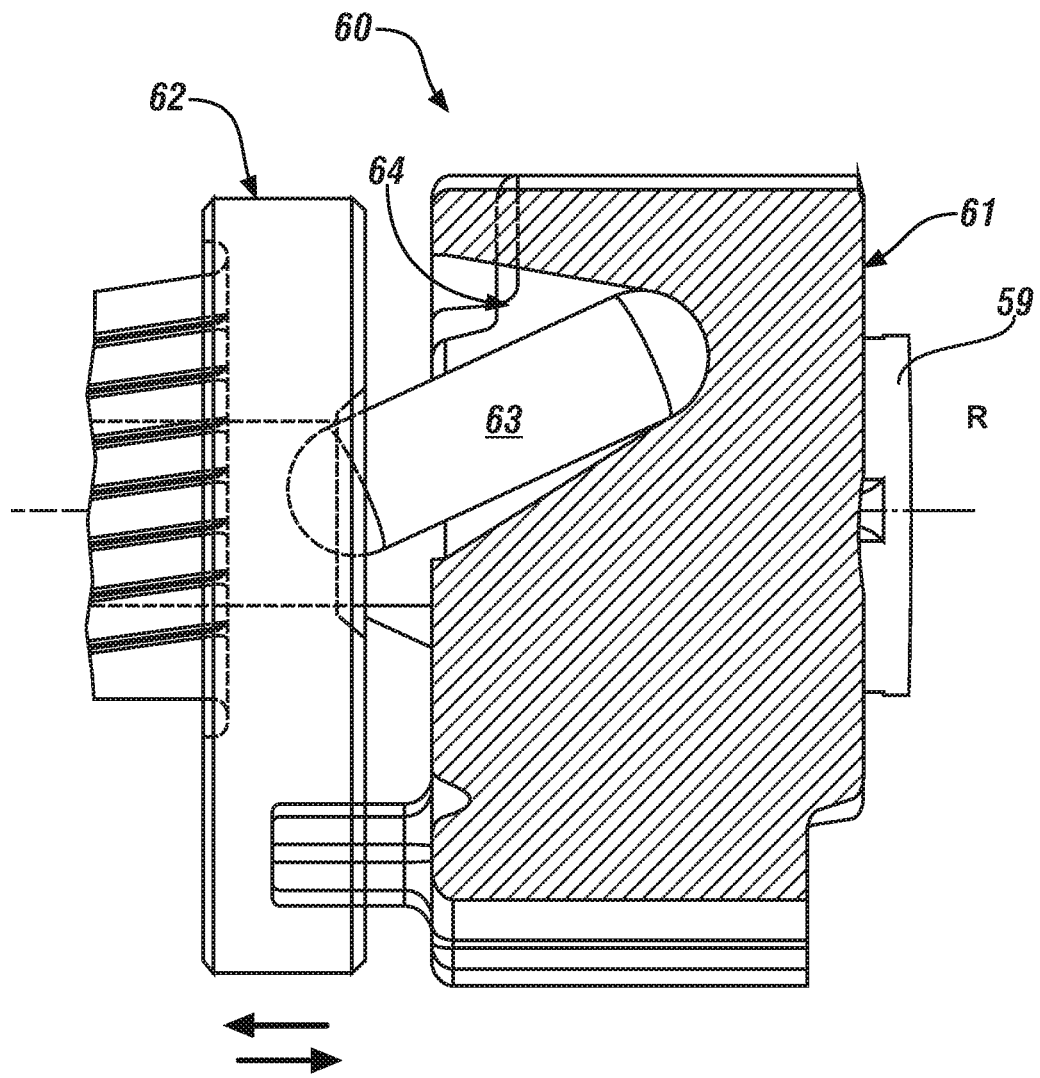
FIG. 5 illustrates one embodiment of a clamping mechanism according to yet another exemplary embodiment of the invention.

In an exemplary embodiment as shown in FIG. 5, the clamping assembly 60 may be a cam assembly. In this embodiment, with further reference to FIG. 2, a first cam portion 61 is connected to the second arm 55 and rotates therewith. The first cam portion 61 includes an opening through which shaft 59 extends. A second cam portion 62 is positioned adjacent to the first cam portion 61 and also includes an opening through which the shaft 59 extends. The second cam portion 62 is movable along the axis 'R' of the shaft 59.

One of the first cam portion 61 and second portion 62 may include at least one projection, and the other of the first and second cam portions may include a recess configured to receive the projection. In the non-limiting embodiment shown in FIG. 5, the projection is a pin 63, and the recess 64 is formed in the first cam portion 61. During rotation of the first cam portion 61 in a direction which locks the adjustment assembly, the pin 63 moves in the recess 64 to apply a force on the second cam portion 62. The force applied to the second cam portion 62 moves the second cam portion 62 along the axis 'R' toward the rake bracket 20 and compression bracket 30. As the first cam portion 61 rotates in a direction to lock the adjustment assembly, the second cam portion 62 applies a clamping force to the rake bracket 20, compression bracket 30 and steering column 11 to lock the steering column or other component against adjustment.

When the first cam portion 61 is rotated in an opposite direction to unlock the adjustment assembly 10, the pin 63 moves in the recess 64 such that the second cam portion 62 is moved along axis 'R' away from the rake bracket 20 and compression bracket 30, i.e., closer to the first cam portion 61, to release the clamping force applied to the rake bracket 20, compression bracket 30 and steering column 11.

As described above in one embodiment, as shown in FIG. 5, the projection may be a pin 63 having one end positioned in a fixing recess of the second cam portion 62. The recess 64, described above, is formed in the first cam portion 61. The recess 64 is shaped and configured to receive another end of the pin 63 and allow the pin 63 to slide therein, such that the pin 63 is moveable between a position that is generally parallel with the axis 'R' when the adjustment assembly is in the locked position and a position that is not generally parallel with the axis 'R' when the adjustment assembly is in the unlocked position.

It is understood that the clamping assembly described above is only one example of a suitable clamping assembly. Other suitable assemblies may include a cam assembly similar to that described above, but with multiple pins. Another suitable cam assembly includes an assembly in which a first cam rotates about an axis and interfaces with a second cam. Due to the interface between the cams, rotation of the first cam causes the second cam to move linearly along an axis either toward or away from the first cam.

In a general exemplary operation, a user selectively applies a force 'F' to the push-pull actuating lever 40. The actuating lever is moveable along a linear travel path between a first position where the adjustment assembly 10 is locked and a second position where the adjustment assembly 10 is unlocked. When a force is applied to the actuating lever 40 to move the actuating lever from the first position to the second position, the actuating lever 40 slides along a linear travel path.

A portion of the actuating lever 40 is connected to the linkage assembly 50 such that movement of the actuating lever 40 causes movement of the linkage assembly 50. Movement of the linkage assembly causes rotation of the clamping assembly 60. Rotation of the clamping assembly 60, when the actuating lever 40 is moved from the first position to the second position, causes the clamping assembly 60 to release a clamping force applied to the rake bracket 20, compression bracket 30 and steering column 11.

Conversely, when the actuating lever 40 is moved from the second position to the first position, the linkage assembly 50 causes the clamping assembly to rotate in an opposite direction and apply a clamping force to the rake bracket 20, compression bracket 30 and steering column 11.

In an exemplary embodiment, with reference to FIGS. 2-4, with the adjustment assembly in a locked condition, a user selectively applies a force 'F' in the direction D1 to move the push-pull actuating lever 40 along a linear travel path in an outward direction, i.e., towards the rear of a vehicle.

The linkage assembly 50 includes first linkage arm 51 and second linkage arm 55. The connecting pin 44 of the actuating lever 40 projects into the first slot 52a at the first end 52 of the first linkage arm 52. The connecting pin 44 exerts a force against sidewalls of the first slot 52a to thereby rotate the first arm 52 about the mounting pin 32 extending from the compression bracket 30 and received in the mounting hole 51a. The first slot 52a is elongated along the length of the first arm 51 to allow for movement of the connecting pin 44 therein to accommodate a change in distance between the connecting pin 44 and the mounting pin 32 as the connecting pin 44 slides along the linear travel path relatively thereto.

A second end 53 of the first linkage arm 51 includes the second slot 53a. The second slot is elongated along the length of the first arm 51 and is configured to receive the ball-shaped projection 56a disposed on the linkage connection end 56 of the second arm 55. The second slot 53a of the first arm 51 is elongated to allow for movement of the ball-shaped projection 56a along the length of the first arm 51 to accommodate a change in distance between the ball-shaped projection 56a and the mounting pin 32 as the ball-shaped projection 56a moves relative to the mounting pin 32.

The clamping connection end 57 of the second arm 55 is rotatably mounted relative to the rake bracket 20, and includes an opening 58 configured to at least partially receive the shaft 59. The shaft 59 defines the rotation axis 'R' about which the second arm 55 rotates. Due to rotation of the second arm 55 about axis 'R', the linkage connection end 56 of the second arm 55 travels in a generally arcuate path. Accordingly, the ball-shaped projection 56a may move in a direction into and out of the second slot 53a while travelling along the arcuate path, without completely exiting second slot 53a.

Rotation of the first arm 51 causes rotation of the second arm 55, due to contact between sidewalls of the second slot 53a and the ball-shaped projection 56a. That is, when the first arm 51 is caused to rotate by application of force 'F' to the actuating lever 40, the sidewalls of the second slot 53a push against the ball-shaped projection 56a to cause the second arm 55 to rotate. In an exemplary embodiment, the second arm 55 rotates in a substantially planar path that is generally perpendicular to the plane in which the first arm 51 rotates. However, the first and second arm are not limited to rotating in generally planar paths or generally planar paths that are generally perpendicular to one another.

Rotation of the second arm 55 in one direction operates the clamping assembly to release the clamping force applied to the rake bracket 20, compression bracket 30 and steering column 11, thereby placing the adjustment assembly 10 in an unlocked state.

With the adjustment assembly 10 in the unlocked position, the user may adjust the steering column 11 in a rake or tilt direction and in a longitudinal or telescoping direction. To adjust the steering column 11 in a rake direction, the user applies a vertical force to the steering column 11. The steering column 11 is then moved in the rake direction relative to the rake bracket. Motion in the rake or tilt direction is accommodated, at least in part, by the rake adjustment slot 21 on the rake bracket 20. During adjustment in the rake direction, the shaft 59 moves along the rake adjustment slot 21. To adjust the steering column 11 in a longitudinal or telescoping direction, the user applies a longitudinal force to the steering column 11.

Once the user has adjusted the component, illustrated as a steering column 11 in the exemplary embodiment, to a desired position, the user may lock the adjustment assembly 10 to fix the steering column 11 in the desired position. In the exemplary embodiment, the user may lock the adjustment assembly 10 by selectively applying a force 'F' in the direction D2 to the push-pull actuating lever 40, to move the actuating lever 40 inward, i.e., toward the front of the vehicle, along the linear travel path.

The inward movement of the of the actuating lever 40 from the second position to the first position causes the first arm 51 of the linkage assembly 50 to rotate by way of the connecting pin 44 positioned in, and applying a force to the sidewalls of first slot 52a of the first arm 51. During inward movement of the actuating lever 40, the first arm 51 rotates in a direction opposite to its direction of rotation during outward movement of the actuating lever 40.

Rotation of the first arm 51 causes the second arm 55 of the linkage assembly 50 to rotate by way of the sidewalls of the second slot 53a of the first arm 51 acting against the ball-shaped projection 56a of the second arm 55. Inward movement of the actuating lever 40 causes the second arm 55 to rotate in a direction opposite to its direction of rotation during outward movement of the actuating lever 40.

The rotation of the second arm 55 operates the clamping assembly 60 to apply a clamping force to the rake bracket 20, compression bracket 30 and steering column 11.

The direction of rotation or movement of the various elements, for example the clamping assembly 60, the first arm 51 and second arm 55 of the linkage assembly 50, and the actuating lever 40 is described above the purposes of example only. The direction of rotation or movement of the various elements may be reversed from the directions described above during locking and unlocking of the adjustment assembly 10. Similarly, the relative position of the components of the clamping assembly 60 may be adjusted to provide a clamping/unclamping function upon movement of other components in directions opposite to the described above. Accordingly, the first position of the actuating lever 40 described above may correspond to a position where the adjustment assembly 10 is in an unlocked condition and the second position may correspond to a position where the adjustment assembly 10 is in a locked position.

The exemplary embodiment and other examples described above provide an adjustment assembly that is actuated by a lever having a linear travel path. By using a lever having a linear travel path, the area of a travel path may be reduced when compared to a rotational lever.

Further, the exemplary embodiments above may provide a mechanical advantage, such that less force need be applied by a user to the actuating lever 40 in order to move the actuating lever 40 between the first and second positions. In an exemplary embodiment, a mechanical advantage may be recognized through the first arm 51 of the linkage and the mounting pin 32. The first arm 51 acts as a lever applying a force to the second arm 55 when a force is applied to the first end 52 of the first arm 51 via the actuating lever 40. The mechanical advantage provided may be increased or decreased based on the position of the mounting pin 32 along the along the length of the first arm 51. For example, if the mounting pin 32 were connected to the mounting hole 51a at a position along the length of the first arm 51 closer to the second slot 53a, the mechanical advantage may be increased. In contrast, the mechanical advantage may be decreased if the mounting pin 32 and mounting hole 51a are positioned along the length of the first arm 51 closer to the first slot 52a.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustment assembly for allowing or preventing adjustment of a component, the adjustment assembly comprising:
   a compression bracket configured to at least partially surround the component;
   a rail connected to the compression bracket so as to extend along the component;
   a rake bracket configured to at least partially surround the compression bracket;
   an actuating lever slidingly coupled to the rail and slidable along a linear travel path defined by the rail, the actuating lever configured to conform to the rail such relative movement between the actuating lever and the rail is prevented in directions transverse to the linear travel path;
   a linkage assembly connected to the compression bracket and coupled to one end of the actuating lever;
   a clamping assembly coupled to the linkage assembly and configured to release a clamping force from the component upon movement of the actuating lever from a first position to a second position, and apply a clamping force to the component upon movement of the actuating lever from the second position to the first position.

2. The adjustment assembly of claim 1, wherein the linkage assembly comprises:
   a first arm having a first end and second end; and
   a second arm having a linkage connection end and clamping connection end.

3. The adjustment assembly of claim 2, wherein the linkage assembly is coupled to the actuating lever at the first end of the first arm, and the first arm is connected to the compression bracket between the first end and second end of the first arm; and
   the linkage connection end of the second arm coupled to the second end of the first arm and the clamping connection end of the second arm coupled to the clamping mechanism.

4. The adjustment assembly of claim 3, wherein the first arm includes a first slot disposed proximate to the first end, a second slot disposed proximate to the second end, and a mounting hole positioned between the first slot and second slot.

5. The adjustment assembly of claim 4, wherein the actuating lever further comprises a connecting pin extending outwardly therefrom, the first slot of the first end of the first arm configured to receive the connecting pin and couple the actuating lever to the first arm of the linkage assembly.

6. The adjustment assembly of claim 4, wherein the compression bracket further comprises a mounting pin extending outwardly therefrom, the mounting pin received by the mounting hole of the first arm and rotatably mounting the first arm of the linkage assembly to the compression bracket.

7. The adjustment assembly of claim 4, wherein the second arm of linkage assembly further comprises a projection formed at the linkage connection end, the projection received by the second slot of the second end of the first arm and coupling the second arm to the first arm.

8. The adjustment assembly of claim 3, wherein the clamping connection end of the second arm comprises an opening formed therein configured to receive a shaft defining an axis about which the second arm rotates.

9. The adjustment assembly of claim 8, wherein the rake bracket includes a rake adjustment slot, and the shaft is configured to slide in the rake adjustment slot during adjustment of the component in a rake direction.

10. The adjustment assembly of claim 2, wherein the first arm of the linkage assembly is coupled to the actuating lever at the first end, rotatably connected to the compression bracket and rotates about a first axis, and coupled to the second arm of the linkage assembly at the second end; and
the second arm is coupled to the clamping assembly at the clamping assembly end, and includes an opening which receives a shaft defining a second axis, the second arm rotating about the second axis such that movement of the push-pull actuating lever between the first position and second position rotates the first arm about the first axis, rotation of the first arm causes rotation of the second arm about the second axis, and rotation of the second arm causes the clamping assembly to release or apply a clamping force to the component.

11. The adjustment assembly of claim 10, wherein the first axis is not parallel to the second axis.

12. The adjustment assembly of claim 1, wherein the actuating lever is a push-pull actuating lever.

13. An adjustable steering column assembly comprising:
a steering column; a compression bracket configured to at least partially surround the steering column;
a rail connected to the compression bracket so as to extend along the steering column;
a rake bracket configured to at least partially surround the compression bracket;
an actuating lever slidingly coupled to the rail and slidable along a linear travel path defined by the rail, the actuating lever configured to conform to the rail such relative movement between the actuating lever and the rail is prevented in directions transverse to the linear travel path;
a linkage assembly connected to the compression bracket and coupled to one end of the actuating lever; a clamping assembly coupled to the linkage assembly and configured to release a clamping force from the steering column upon movement of the actuating lever from a first position to a second position, and apply a clamping force to the steering column upon movement of the actuating lever from the second position to the first position.

14. The adjustment assembly of claim 13, wherein the linkage assembly comprises:
a first arm having a first end and second end; and a second arm having a linkage connection end and clamping connection end.

15. The adjustment assembly of claim 14, wherein the linkage assembly is coupled to the actuating lever at the first end of the first arm, and the first arm is connected to the compression bracket between the first end and second end of the first arm; and
the linkage connection end of the second arm coupled to the second end of thefirst arm and the clamping connection end of the second arm coupled to theclamping mechanism.

16. The adjustment assembly of claim 15, wherein the first arm includes a first slot disposed proximate to the first end, a second slot disposed proximate to the second end, and a mounting hole positioned between the first slot and second slot.

17. The adjustment assembly of claim 16, wherein the actuating lever further comprises a connecting pin extending outwardly therefrom, the first slot of the first end of the first arm configured to receive the connecting pin and couple the actuating lever to the first arm of the linkage assembly.

18. The adjustment assembly of claim 16, wherein the compression bracket further comprises a mounting pin extending outwardly therefrom, the mounting pin received by the mounting hole of the first arm and rotatably mounting the first arm of the linkage assembly to the compression bracket.

19. The adjustment assembly of claim 16, wherein the second arm of linkage assembly further comprises a projection formed at the linkage connection end, the projection received by the second slot of the second end of the first armand coupling second arm to the first arm.

20. The adjustment assembly of claim 15, wherein the clamping connection end of the second arm comprises an opening formed therein configured to receive a shaft defining an axis about which the second arm rotates.

21. The adjustment assembly of claim 20, wherein the shaft is configured to slide in the rake adjustment slot during adjustment of the steering column in a rake direction.

22. The adjustment assembly of claim 14, wherein the first arm of the linkage assembly is coupled to the actuating lever at the first end, rotatably connected to the compression bracket and a rotates about a first axis, and coupled to the second arm of the linkage assembly at the second end; and the second arm is coupled to the clamping assembly at the clamping connection end, and includes an opening which receives a shaft defining a second axis, the second arm rotating about the second axis such that movement of the actuating lever between the first position and second position rotates the first arm about the first axis, rotation of the first arm causes rotation of the second arm about the second axis, and rotation of the second arm causes the clamping assembly to release or apply a clamping force to the component.

23. The adjustment assembly of claim 22, wherein the first axis is not parallel to the second axis.

\* \* \* \* \*